TANDEM ELECTRICAL CONTROL INSTRUMENTALITY

Filed July 9, 1956

Inventors
Wilbert H. Budd
Hilbert L. Slough
By Dickerson Jones
Attorney

United States Patent Office 2,874,255

Patented Feb. 17, 1959

2,874,255

TANDEM ELECTRICAL CONTROL INSTRUMENTALITY

Wilbert H. Budd and Hilbert L. Slough, Elkhart, Ind., assignors to Chicago Telephone Supply Corporation, Elkhart, Ind., a corporation of Indiana Application July 9, 1956, Serial No. 596,582

4 Claims. (Cl. 201—55)

Figures 1, 2:
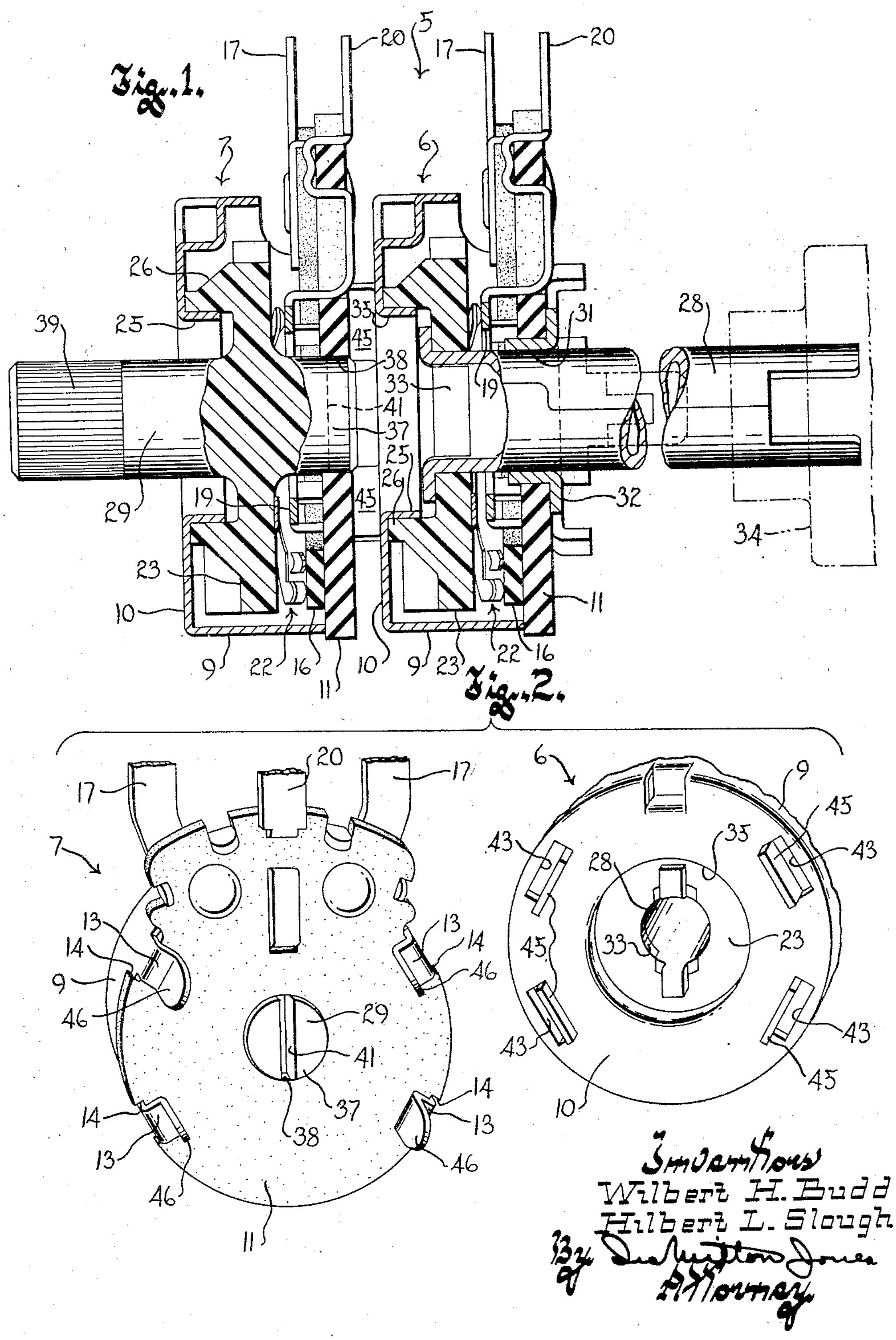

This invention relates to electrical control instrumentalities and has more particular reference to variable resistors of the type commonly employed in television receivers to provide for adjustment of the picture of the receiver.

Television receivers are commonly equipped with two types of variable resistors to provide for adjustment of those circuits which control the picture of the receiver. The variable resistors of one type require frequent adjustment, and it has been customary to mount such frequently adjusted resistors on the front portion of the receiver chassis with their operating shafts readily accessible at the front of the receiver. Thus it is possible to change the setting of the frequently adjusted variable resistors and, at the same time, readily observe the effect of such adjustment on the picture.

The other kind of variable resistor is known as the preset type, since it is only infrequently adjusted. The preset type of resistors are ordinarily, though not exclusively, adjusted by a television serviceman; and tampering with their adjustment is intentionally discouraged by the manufacturers of most television receivers through the expedient of mounting them on the back of the receiver chassis.

Obviously, this poses an extremely difficult problem for anyone called upon to adjust the pre-set controls at the back of the television receiver, since the picture cannot be observed at the time the adjustment is being made. Except in the case of small or portable television receivers, the only way the picture can be observed by the person making an adjustment of the pre-set controls during adjustment thereof, is by holding a mirror in the front of the receiver so that the reflection of the picture can be seen from the back of the receiver.

The present invention has as its general object the provision of an electrical control instrumentality comprising a variable resistor of the pre-set type, which can be so mounted on a television receiver as to discourage unauthorized adjustment or tampering therewith, while at the same time facilitating the adjustment of the control from the front of the television receiver by authorized persons such as television repairmen.

More specifically, it is a purpose of this invention to provide a tandem variable resistance control instrumentality comprising one of the frequently adjusted variable resistors at the front of the unit and one of the infrequently adjusted or pre-set variable resistors at the back of the unit, and wherein the provision of a tubular operating shaft for the front variable resistor defines an axial passage normally closed by a knob on the front of the shaft, and through which passage access may be had to the control shaft of the pre-set variable resistor at the rear of the unit upon removal of the knob from the front of the tubular operating shaft for the front variable resistor. With this arrangement, of course, it is intended that the tandem variable resistance control instrumentality be mounted on the front of a television receiver with the control shaft of the forward or frequently adjusted variable resistor accessible for operation at the front of the receiver.

Another object of this invention resides in the provision of a tandem electrical control instrumentality of the character described, wherein novel means is employed to secure the two components of the unit together in spaced apart coaxial relationship.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof and in which:

Figure 1 is a longitudinal sectional view through a tandem variable resistance control instrumentality embodying this invention; and Figure 2 is a group perspective view showing the front of the rear variable resistor and the back of the front variable resistor, before these two components are secured together.

Referring now more particularly to the accompanying drawing, in which like reference characters have been applied to like parts in the two views, the numeral 5 generally designates a tandem electrical control instrumentality of a type which comprises front and rear variable resistors 6 and 7, respectively, the rear resistor 7 being mounted on the back of the front resistor 6, coaxial therewith.

In general, and except as noted hereinafter, the variable resistors 6 and 7 follow more or less conventional construction. Each comprises a housing having a substantially tubular metal side wall 9 extending axially between a metal back wall 10 and an insulative front wall 11. The side and back walls 9 and 10 of each resistor housing are preferably integral with one another, while the front wall is provided by a disc of insulative material and serves as a terminal head for the resistor. Each terminal head, of course, seats flatwise upon the end of the side wall 9 of the housing remote from its back wall 10, and is securely held in place thereon by a series of tangs 13 such as shown in Figure 2 extended forwardly from the side wall around peripheral portions of the terminal head and bent over against the front face of the latter. These tangs are preferably received in notches 14 in the periphery of the terminal head so as to hold the same against rotation on the housing.

Also following more or less conventional construction, each of the resistors includes an arcuate resistance strip 16 flatwise overlying and secured to the rear face of the terminal head with terminals 17 connecting with its opposite ends and projecting outwardly through an aperture in the side wall 9 of the housing. Centrally of the resistance element 16 each resistor is also provided with a collector ring 19, secured to the terminal head, and having a terminal 20 secured thereto and likewise projecting laterally outwardly of the housing to be disposed intermediate the terminals 17 of the resistance strip.

A contactor 22 in each of the housings overlies the rear of the resistance strip and has the usual resilient fingers thereon to ride upon the resistance element and the collector ring; and each of the contactors is secured to a rotatable contact carrier 23 of insulative material. In this instance, the carriers shown are of the molded type.

The insulative carrier 23 of each resistor is supported by the housing for rotation on a fixed axis concentric to the resistance strip and normal to the plane of the faces of the terminal head. For this purpose, the back wall of the housing has an annular inturned flange 25 thereon which projects forwardly into a rearwardly projecting annular flange 26 on the molded carrier to provide a bearing for the carrier. It will be understood, of course, that the carrier flange fits loosely enough on the flange 25 as to enable the carrier to be rotated freely thereon.

It is also to be noted that the annular flange 26 on the carrier bears against the inner surface of the rear wall 10 of the housing outwardly of the bearing flange 25 thereon, and that the axial length of the carrier flange is such as to maintain the contact fingers engaged with the resistance element and collector ring with the desired degree of tension.

The front and rear variable resistors 6 and 7 are provided with coaxial operating shafts 28 and 29, respectively, by which rotation may be imparted to the contact carrier of each resistor to adjust the setting thereof. According to this invention, the operating shaft 28 of the front resistor 6 is tubular, as shown in Figure 1. It is rotatably journalled in a bearing on the terminal head 11, the bearing being provided either by a hole in the terminal head or by a bearing sleeve 31 fixed therein. In this case, the bearing sleeve is shown as part of a grounding plate 32 which is secured over the front surface of the terminal head 11.

The tubular shaft 28 projects rearwardly into the housing 6 to have its rear portion secured in a central hole 33 in the contact carrier 23, thus providing for the transmission of rotation to the carrier by the application of torque to a knob, indicated at 34, on the exposed front end of the operating shaft. The manner in which the inner end portion of the tubular shaft 28 is fixed to the contact carrier 23 of the front resistor forms no part of this invention, and is, moreover, shown and described in Patent No. Re. 23,750, issued to Mervin B. Arisman et. al. on December 15, 1953. It is sufficient to note that the hole 33 in the carrier 23 is coaxial with a hole 35 in the back wall 10 of the housing, defined by the inwardly turned bearing flange 25 thereon.

Thus, with the construction described, it will be appreciated that the operating shaft 28 of the front resistor defines an axial passage leading rearwardly through the housing and opening to the rear thereof through the hole 35 in the back wall 10 of the housing.

Primarily for purposes of illustration, the rear resistor 7 has been shown provided with an operating shaft 29 which is formed integrally with the molded insulative carrier 23 thereof. Regardless of whether the shaft is integral with the carrier or not, it preferably has a short portion 37 projecting forwardly from the carrier and terminating in a bearing hole 38 in the terminal head, coaxially of the shaft 28 of the front resistor. If desired, the shaft 29 may have a somewhat longer portion 39 projecting rearwardly from the carrier and passing through and beyond the back wall 10 of the rear resistor to provide for adjustment of the setting of the latter from the rear of the tandem control instrumentality.

In general, the front resistor 6 is of the frequently adjusted type while the rear resistor 7 is of the infrequently adjusted type commonly referred to as a pre-set control, which is ordinarily mounted on the rear of the chassis of a television receiver and adjusted only from the back thereof. Assuming that the tandem control instrumentality of this invention is mounted upon a panel at the front of a television receiver, with the operating shaft 28 of the front resistor projecting forwardly through a hole in the panel and having a knob 34 mounted on its bifurcated front end, the front variable resistor may be adjusted at will by the operator of the receiver, from directly in front of the receiver, in a manner enabling the effect of such adjustment on the picture of the receiver to be readily observed.

In the event adjustment of the pre-set variable resistor 7 becomes necessary, such adjustment may be readily accomplished by an authorized person such as a television serviceman merely by removal of the knob from the front end of the tubular operating shaft 28 of the front variable resistor and by insertion of the elongated blade of a screw driver (not shown) through the control shaft 28 and into a screw driver slot 41 in the front of the operating shaft 29 of the rear variable resistor. In this way, the effect of the adjustment of the pre-set variable resistor 7 on the picture of the receiver can be most conveniently observed from directly in front of the receiver, thereby eliminating the need for the serviceman holding or mounting a mirror in front of the receiver while making adjustments in the usual manner in preset controls located at the back of the receiver.

It is highly important to note that the knob 34 on the operating shaft 28 not only normally blocks the sole access to the front end of the rear shaft 29 for the pre-set variable resistor 7, but also normally conceals the passage defined by the hollow operating shaft 28 leading thereto. This is a desirable feature of the control instrumentaility of this invention, inasmuch as it not only discourages but goes a long way toward precluding unauthorized tampering with the setting of the pre-set control 7.

The pre-set variable resistor 7 is fixed to the back of the front resistor 6 by novel means now to be described, with the operating shafts 28 and 29 of the resistors in axial alignment. For this purpose, a series of slit-like apertures 43 is formed in the rear wall 10 of the front resistor at locations spaced outwardly of the axis of the operating shaft 28 thereof and with the apertures spaced circumferentially from one another, as shown best in Figure 2. These apertures are defined by striking a series of tabs 45 rearwardly from the wall 10 of the front resistor housing. These tabs have square rear edges which abut the front face of the terminal head 11 on the preset control 7 to hold the two resistors spaced apart a predetermined distance which is adequate for electrical clearance therebetween.

As seen best in Figure 2, the locations of the slit-like apertures 43 are such that they align with the forward end portions 46 of the tangs 13 by which the terminal head of the pre-set control is secured to the housing of the latter. It will be understood, of course, that only the inner end portions of the tangs 13 are bent inwardly over the outer face of the terminal head, while the forwardly projecting outer end portions 46 of the tangs are necessarily offset inwardly from the periphery of the terminal head.

The slit-like apertures 43 are of a size to receive the forward end portions 46 of the tangs 13 so that when the two resistors are assembled one on the back of the other, as shown in Figure 1, the outer end portions 46 of the tangs pass through the slit-like apertures 43 and may then be bent inwardly over the front face of the rear wall 10 of the forward variable resistor to secure the two resistors together, with the resistors spaced apart a distance corresponding to the axial length of the tabs 45.

In this manner, the same tangs which are employed to secure the terminal head of the pre-set control 7 to the housing of the latter, are also employed to secure the pre-set control to the back of the front resistor 6; and the rearwardly struck tabs which space the resistors apart define the slit-like apertures in which the securing tangs are received.

From the foregoing description taken together with the accompanying drawing, it will be readily apparent to those skilled in the art that this invention provides a unique and highly desirable solution to the problem of facilitating authorized adjustment of the pre-set variable resistor of a television receiver or the like, while at the same time discouraging tampering with the resistor; and that this invention also simplifies the attachment of the rear control instrumentality to the forward control instrumentality of a tandem unit designed primarily but not exclusively for the adjustment of resistances in television receiver circuits.

What is claimed as our invention is:

1. In a tandem variable resistance control instrumentality of the type having front and rear variable resistors each mounted in a housing having spaced front and rear walls, the front and rear walls of the front housing having coaxial apertures therein and the front wall of the rear housing having a central aperture therein; means mounting the rear resistor housing on the back of the front resistor housing with the front wall of the rear housing opposing the rear wall of the front housing, and with all of said apertures coaxial; a pair of endwise spaced operating shafts rotatably carried by said housings coaxially with one another and with said apertures, the shaft of the front resistor projecting a distance forwardly from the front wall of its housing to provide for mounting a knob on its forward end portion, and said front shaft being tubular so as to cooperate with the aperture in the rear wall of its housing to define an axial passage leading entirely through the front housing when the knob on the forward end portion of said shaft is removed, said passage providing the sole means of access to the front end of the shaft of the rear resistor for adjustment of said rear shaft by a tool inserted through the tubular shaft of the front resistor.

2. The tandem variable resistance control instrumentality set forth in claim 1 further characterized by the provision of means mounting the rear resistor housing on the back of the front resistor housing with the front wall of the rear housing spaced from and opposing the rear wall of the front housing, said mounting means comprising a plurality of tabs struck rearwardly from the rear wall of the front housing to define slit-like openings therein at locations spaced circumferentially with respect to the operating shaft axis, the rear edges of said tabs bearing against the front wall of the rear resistor housing to hold said housing spaced apart a predetermined distance, and securement means on the housing of the rear resistor passing forwardly through said slit-like openings in the rear wall of the front housing and bent over the forward face thereof to hold the front wall of the rear housing clamped tightly against the rear edges of said tabs.

3. A tandem variable resistance control instrumentality of the type comprising a pair of variable resistors having housings one mounted on the back of the other and each comprising a substantially tubular metal side wall extending axially between a metal back wall and an insulative front wall which defines a terminal head, and each resistor having a rotatable operating shaft extending rearwardly through its front wall and arranged coaxially with the shaft of the other resistor, characterized by: the fact that the back wall of the front resistor has an opening therein aligning with the operating shaft axis, and has a plurality of tabs struck rearwardly therefrom to define slit-like openings therein at locations spaced circumferentially with respect to the operating shaft axis, the rear edges of said tabs bearing against the front wall of the rear resistor to hold said housing spaced apart a predetermined distance; by the fact that the front wall of the rear resistor is secured to the side wall of the rear resistor housing by a plurality of forwardly projecting tangs on the side wall bent inwardly over peripheral portions of the front wall and overlying the front face thereof, the outer end portions of said tangs passing forwardly through said slit-like openings in the rear wall of the front resistor and being bent over the front surface of said rear wall of the front resistor to hold the rear resistor in place on the back thereof; by the fact that the front end of the shaft of the rear resistor is spaced wholly rearwardly of the shaft of the front resistor; and by the fact that the shaft of the front resistor is tubular so that access may be had to the front of the shaft of the rear resistor for adjustment thereof by a tool inserted through the tubular shaft of the front resistor from the front of the tandem control instrumentality.

4. In a dual electrical control device: housing means having front and rear walls and front and rear compartments with intermediate wall means therebetween, the intermediate wall means being centrally apertured; a control instrumentality in each of said compartments including a rotor, the rotors of the two control instrumentalities being coaxial and independent of one another, the front rotor having a hole centrally therethrough; means for rotatably adjusting the rear rotor including a rotatable shaft coaxially fixed thereto and projecting forwardly therefrom in line with the centrally apertured portion of the intermediate wall means; and an operating shaft having a hole lengthwise therethrough registering with the hole in the front rotor, said operating shaft projecting through the front wall of the housing means and therebeyond to provide for mounting a knob on its front end portion, said operating shaft having its front portion disposed a substantial distance forwardly of the shaft on the rear rotor so as to effectively conceal the latter even when the operating knob is removed, and to fully conceal and block access thereto when the operating knob is in position so that adjustment of the rear rotor by a tool inserted through the operating shaft for engagement with the front end of the rear rotor shaft requires knowledge of the said structure and removal of the operating knob from the front end of the operating shaft.

References Cited in the file of this patent

UNITED STATES PATENTS

| | | |
|---|---|---|
| Re. 23,750 | Arisman et al. | Dec. 15, 1953 |
| 2,500,281 | Fell | Mar. 14, 1950 |
| 2,659,793 | Daily et al. | Nov. 17, 1953 |
| 2,669,634 | Daily et al. | Feb. 16, 1954 |
| 2,745,927 | Daily et al. | May 15, 1956 |